(12) United States Patent
Chen

(10) Patent No.: US 9,972,216 B2
(45) Date of Patent: May 15, 2018

(54) SYSTEM AND METHOD FOR STORING AND PLAYBACK OF INFORMATION FOR BLIND USERS

(71) Applicant: Toyota Motor Engineering & Manufacturing North America, Inc., Erlanger, KY (US)

(72) Inventor: Tiffany L. Chen, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days. days.

(21) Appl. No.: 14/664,234

(22) Filed: Mar. 20, 2015

(65) Prior Publication Data

US 2016/0275817 A1    Sep. 22, 2016

(51) Int. Cl.
*G01C 21/20* (2006.01)
*G09B 21/00* (2006.01)

(52) U.S. Cl.
CPC ......... *G09B 21/007* (2013.01); *G09B 21/006* (2013.01)

(58) Field of Classification Search
CPC ............ H04N 21/41407; G09B 21/007; G09B 21/006; G09B 21/003; G09B 21/008; G09B 21/00; G09B 21/001; G09B 21/009; G09B 19/00; G09B 21/02; G09B 29/004; G09B 21/004; G09B 5/06; G09B 5/14; G09B 15/02; G09B 19/0015

(Continued)

(56) References Cited

U.S. PATENT DOCUMENTS 4,520,501 A    5/1985    DuBrucq
4,586,827 A    5/1986    Hirsch et al.
(Continued)

FOREIGN PATENT DOCUMENTS

CN    201260746    6/2009
CN    101527093    9/2009
(Continued)

OTHER PUBLICATIONS

Greenberg, Maya Delgado et al.; "Finding Your Way a Curriculum for Teaching and Using the Braillenote with Sendero GPS 2011"; 190 pages; 2011.

(Continued)

*Primary Examiner* — Yong Hang Jiang
(74) *Attorney, Agent, or Firm* — Snell & Wilmer

(57) ABSTRACT

A system for providing information to a user includes a haptic display including a plurality of sensors positioned thereon, a map positioned on the haptic display and including points of interest where each point of interest is positioned adjacent to or directly on at least one of the plurality of sensors, and a memory for storing a plurality of breadcrumb files where each of the plurality of breadcrumb files corresponds to at least one of the points of interest and contains information related to at least one of an environment, an object, an obstacle, a path or a location. The system includes a processor for determining which point of interest has been selected based on contact with at least one of the points of interest and an output device configured to provide the information contained in the breadcrumb file corresponding to the selected point of interest to the user.

20 Claims, 6 Drawing Sheets

(58) Field of Classification Search
USPC .................................................. 340/4.12
See application file for complete search history.

(56) References Cited

U.S. PATENT DOCUMENTS

| | | | |
|---|---|---|---|
| 4,786,966 A | 11/1988 | Hanson | |
| 5,047,952 A | 9/1991 | Kramer | |
| 5,097,856 A | 3/1992 | Chi-Sheng | |
| 5,129,716 A | 7/1992 | Holakovszky et al. | |
| 5,233,520 A | 8/1993 | Kretsch et al. | |
| 5,265,272 A | 11/1993 | Kurcbart | |
| 5,463,428 A | 10/1995 | Lipton et al. | |
| 5,508,699 A | 4/1996 | Silverman | |
| 5,539,665 A | 7/1996 | Lamming et al. | |
| 5,543,802 A | 8/1996 | Villevieille | |
| 5,544,050 A | 8/1996 | Abe | |
| 5,568,127 A | 10/1996 | Bang | |
| 5,636,038 A | 6/1997 | Lynt | |
| 5,659,764 A | 8/1997 | Sakiyama | |
| 5,701,356 A * | 12/1997 | Stanford | H04R 5/023 381/370 |
| 5,733,127 A | 3/1998 | Mecum | |
| 5,807,111 A | 9/1998 | Schrader | |
| 5,872,744 A | 2/1999 | Taylor | |
| 5,953,693 A | 9/1999 | Sakiyama | |
| 5,956,630 A | 9/1999 | Mackey | |
| 5,982,286 A | 11/1999 | Vanmoor | |
| 6,009,577 A | 1/2000 | Day | |
| 6,055,048 A | 4/2000 | Langevin et al. | |
| 6,067,112 A | 5/2000 | Wellner et al. | |
| 6,199,010 B1 | 3/2001 | Richton | |
| 6,229,901 B1 | 5/2001 | Mickelson et al. | |
| 6,230,135 B1 | 5/2001 | Ramsay | |
| 6,230,349 B1 | 5/2001 | Silver et al. | |
| 6,285,757 B1 | 9/2001 | Carroll et al. | |
| 6,307,526 B1 | 10/2001 | Mann | |
| 6,323,807 B1 | 11/2001 | Golding et al. | |
| 6,349,001 B1 | 2/2002 | Spitzer | |
| 6,466,232 B1 | 10/2002 | Newell | |
| 6,477,239 B1 | 11/2002 | Ohki | |
| 6,542,623 B1 | 4/2003 | Kahn | |
| 6,580,999 B2 | 6/2003 | Maruyama et al. | |
| 6,594,370 B1 | 7/2003 | Anderson | |
| 6,603,863 B1 | 8/2003 | Nagayoshi | |
| 6,619,836 B1 | 9/2003 | Silvant et al. | |
| 6,701,296 B1 | 3/2004 | Kramer | |
| 6,774,788 B1 | 8/2004 | Balfe | |
| 6,825,875 B1 | 11/2004 | Strub et al. | |
| 6,826,477 B2 | 11/2004 | Ladetto et al. | |
| 6,834,373 B2 | 12/2004 | Dieberger | |
| 6,839,667 B2 | 1/2005 | Reich | |
| 6,857,775 B1 | 2/2005 | Wilson | |
| 6,920,229 B2 | 7/2005 | Boesen | |
| D513,997 S | 1/2006 | Wilson | |
| 7,027,874 B1 | 4/2006 | Sawan et al. | |
| D522,300 S | 6/2006 | Roberts | |
| 7,069,215 B1 | 6/2006 | Bangalore | |
| 7,106,220 B2 | 9/2006 | Gourgey et al. | |
| 7,228,275 B1 | 6/2007 | Endo | |
| 7,299,034 B2 | 11/2007 | Kates | |
| 7,308,314 B2 | 12/2007 | Havey et al. | |
| 7,336,226 B2 | 2/2008 | Jung et al. | |
| 7,356,473 B2 | 4/2008 | Kates | |
| 7,413,554 B2 | 8/2008 | Kobayashi et al. | |
| 7,417,592 B1 | 8/2008 | Hsiao et al. | |
| 7,428,429 B2 | 9/2008 | Gantz et al. | |
| 7,463,188 B1 | 12/2008 | McBurney | |
| 7,496,445 B2 | 2/2009 | Mohsini | |
| 7,501,958 B2 | 3/2009 | Saltzstein et al. | |
| 7,525,568 B2 | 4/2009 | Raghunath | |
| 7,564,469 B2 | 7/2009 | Cohen | |
| 7,565,295 B1 | 7/2009 | Hernandez-Rebollar | |
| 7,598,976 B2 | 10/2009 | Sofer et al. | |
| 7,618,260 B2 | 11/2009 | Daniel et al. | |
| D609,818 S | 2/2010 | Tsang et al. | |
| 7,656,290 B2 | 2/2010 | Fein et al. | |
| 7,659,915 B2 | 2/2010 | Kurzweil et al. | |
| 7,743,996 B2 | 6/2010 | Maciver | |
| D625,427 S | 10/2010 | Lee | |
| 7,843,351 B2 | 11/2010 | Bourne | |
| 7,843,488 B2 | 11/2010 | Stapleton | |
| 7,848,512 B2 | 12/2010 | Eldracher | |
| 7,864,991 B2 | 1/2011 | Espenlaub et al. | |
| 7,938,756 B2 | 5/2011 | Rodetsky et al. | |
| 7,991,576 B2 | 8/2011 | Roumeliotis | |
| 8,005,263 B2 | 8/2011 | Fujimura | |
| 8,035,519 B2 | 10/2011 | Davis | |
| D649,655 S | 11/2011 | Petersen | |
| 8,123,660 B2 | 2/2012 | Kruse et al. | |
| D656,480 S | 3/2012 | McManigal et al. | |
| 8,138,907 B2 | 3/2012 | Barbeau et al. | |
| 8,150,107 B2 | 4/2012 | Kurzweil et al. | |
| 8,177,705 B2 | 5/2012 | Abolfathi | |
| 8,239,032 B2 | 8/2012 | Dewhurst | |
| 8,253,760 B2 | 8/2012 | Sako et al. | |
| 8,300,862 B2 | 10/2012 | Newton et al. | |
| 8,325,263 B2 | 12/2012 | Kato et al. | |
| D674,501 S | 1/2013 | Petersen | |
| 8,359,122 B2 | 1/2013 | Koselka et al. | |
| 8,395,968 B2 | 3/2013 | Vartanian et al. | |
| 8,401,785 B2 | 3/2013 | Cho et al. | |
| 8,414,246 B2 | 4/2013 | Tobey | |
| 8,418,705 B2 | 4/2013 | Ota et al. | |
| 8,428,643 B2 | 4/2013 | Lin | |
| 8,483,956 B2 | 7/2013 | Zhang | |
| 8,494,507 B1 | 7/2013 | Tedesco et al. | |
| 8,494,859 B2 | 7/2013 | Said | |
| 8,538,687 B2 | 9/2013 | Plocher et al. | |
| 8,538,688 B2 | 9/2013 | Prehofer | |
| 8,571,860 B2 | 10/2013 | Strope | |
| 8,583,282 B2 | 11/2013 | Angle et al. | |
| 8,588,464 B2 | 11/2013 | Albertson et al. | |
| 8,588,972 B2 | 11/2013 | Fung | |
| 8,591,412 B2 | 11/2013 | Kovarik et al. | |
| 8,594,935 B2 | 11/2013 | Cioffi et al. | |
| 8,606,316 B2 | 12/2013 | Evanitsky | |
| 8,610,879 B2 | 12/2013 | Ben-Moshe et al. | |
| 8,630,633 B1 | 1/2014 | Tedesco et al. | |
| 8,676,274 B2 | 3/2014 | Li | |
| 8,676,623 B2 | 3/2014 | Gale et al. | |
| 8,694,251 B2 | 4/2014 | Janardhanan et al. | |
| 8,704,902 B2 | 4/2014 | Naick et al. | |
| 8,718,672 B2 | 5/2014 | Xie et al. | |
| 8,743,145 B1 | 6/2014 | Price | |
| 8,750,898 B2 | 6/2014 | Haney | |
| 8,768,071 B2 | 7/2014 | Tsuchinaga et al. | |
| 8,786,680 B2 | 7/2014 | Shiratori | |
| 8,797,141 B2 | 8/2014 | Best et al. | |
| 8,797,386 B2 | 8/2014 | Chou et al. | |
| 8,803,699 B2 | 8/2014 | Foshee et al. | |
| 8,805,929 B2 | 8/2014 | Erol et al. | |
| 8,812,244 B2 | 8/2014 | Angelides | |
| 8,814,019 B2 | 8/2014 | Dyster et al. | |
| 8,825,398 B2 | 9/2014 | Alexandre | |
| 8,836,532 B2 | 9/2014 | Fish, Jr. et al. | |
| 8,836,580 B2 | 9/2014 | Mendelson | |
| 8,836,910 B2 | 9/2014 | Cashin et al. | |
| 8,902,303 B2 | 12/2014 | Na'Aman et al. | |
| 8,909,534 B1 | 12/2014 | Heath | |
| D721,673 S | 1/2015 | Park et al. | |
| 8,926,330 B2 | 1/2015 | Taghavi | |
| 8,930,458 B2 | 1/2015 | Lewis et al. | |
| 8,981,682 B2 | 3/2015 | Delson et al. | |
| 8,994,498 B2 | 3/2015 | Agrafioti | |
| D727,194 S | 4/2015 | Wilson | |
| 9,004,330 B2 | 4/2015 | White | |
| 9,025,016 B2 | 5/2015 | Wexler et al. | |
| 9,042,596 B2 | 5/2015 | Connor | |
| 9,053,094 B2 | 6/2015 | Yassa | |
| 9,076,450 B1 | 7/2015 | Sadek | |
| 9,081,079 B2 | 7/2015 | Chao et al. | |
| 9,081,385 B1 | 7/2015 | Ferguson | |
| D736,741 S | 8/2015 | Katz | |
| 9,111,545 B2 | 8/2015 | Jadhav et al. | |

(56) References Cited

U.S. PATENT DOCUMENTS

| | | |
|---|---|---|
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 9,812,165 B2 * | 11/2017 | Ullrich ............ G11B 20/10527 |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Hunter |
| 2003/0133008 A1 | 7/2003 | Stephenson |
| 2003/0133085 A1 | 7/2003 | Tretiakoff |
| 2003/0179133 A1 | 9/2003 | Pepin et al. |
| 2004/0056907 A1 | 3/2004 | Sharma |
| 2004/0186713 A1 * | 9/2004 | Gomas ................. G09B 21/006 704/235 |
| 2004/0232179 A1 | 11/2004 | Chauhan |
| 2004/0267442 A1 | 12/2004 | Fehr et al. |
| 2005/0020845 A1 | 1/2005 | Suzuki et al. |
| 2005/0221260 A1 | 10/2005 | Kikuchi |
| 2005/0259035 A1 | 11/2005 | Iwaki |
| 2005/0283752 A1 | 12/2005 | Fruchter |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1 | 10/2007 | Foss |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0194175 A1 * | 8/2008 | Last .................. A63H 3/28 446/302 |
| 2008/0198222 A1 * | 8/2008 | Gowda ................. A61H 3/061 348/62 |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0058611 A1 | 3/2009 | Kawamura |
| 2009/0106016 A1 | 4/2009 | Athsani |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 * | 5/2013 | Weiland ................. G01C 21/20 701/516 |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |

(56) References Cited

U.S. PATENT DOCUMENTS

| | | |
|---|---|---|
| 2013/0184982 A1 | 7/2013 | DeLuca |
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland |
| 2014/0031081 A1 | 1/2014 | Vossoughi |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1 | 2/2014 | Takahama |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0160250 A1 | 6/2014 | Pomerantz |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1 | 12/2014 | Miskin |
| 2014/0379251 A1 | 12/2014 | Tolstedt |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0058237 A1 | 2/2015 | Bailey |
| 2015/0109107 A1 | 4/2015 | Gomez et al. |
| 2015/0120186 A1 | 4/2015 | Heikes |
| 2015/0125831 A1 | 5/2015 | Chandrashekhar Nair et al. |
| 2015/0135310 A1 | 5/2015 | Lee |
| 2015/0141085 A1 | 5/2015 | Nuovo et al. |
| 2015/0142891 A1 | 5/2015 | Haque |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0324646 A1 | 11/2015 | Kimia |
| 2015/0330787 A1 | 11/2015 | Cioffi et al. |
| 2015/0336276 A1 | 11/2015 | Song |
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1 | 12/2015 | Pajestka |
| 2015/0364943 A1 | 12/2015 | Vick |
| 2015/0367176 A1 | 12/2015 | Bejestan |
| 2015/0375395 A1 | 12/2015 | Kwon |
| 2016/0007158 A1 | 1/2016 | Venkatraman |
| 2016/0042228 A1 | 2/2016 | Opalka |
| 2016/0078289 A1 | 3/2016 | Michel |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1 | 12/2016 | Rajendran |

FOREIGN PATENT DOCUMENTS

| | | | |
|---|---|---|---|
| CN | 201440733 | 4/2010 | |
| CN | 101803988 | 8/2010 | |
| CN | 101647745 | 1/2011 | |
| CN | 102316193 | 1/2012 | |
| CN | 102631280 | 8/2012 | |
| CN | 202547659 | 11/2012 | |
| CN | 202722736 | 2/2013 | |
| CN | 102323819 | 6/2013 | |
| CN | 103445920 | 12/2013 | |
| DE | 102011080056 | 1/2013 | |
| DE | 102012000587 | 7/2013 | |
| DE | 102012202614 | 8/2013 | |
| EP | 1174049 | 9/2004 | |
| EP | 1721237 | 11/2006 | |
| EP | 2368455 | 9/2011 | |
| EP | 2371339 | 10/2011 | |
| EP | 2127033 | 8/2012 | |
| EP | 2581856 | 4/2013 | |
| EP | 2751775 | 7/2016 | |
| FR | 2885251 | 11/2006 | |
| GB | 2287535 A * | 9/1995 | ............ A61H 3/061 |
| GB | 2401752 | 11/2004 | |
| JP | 1069539 | 3/1998 | |
| JP | 2001304908 | 10/2001 | |
| JP | 201012529 | 1/2010 | |
| JP | 2010182193 | 8/2010 | |
| JP | 4727352 | 7/2011 | |
| JP | 2013169611 | 9/2013 | |
| KR | 100405636 | 11/2003 | |
| KR | 20080080688 | 9/2008 | |
| KR | 20120020212 | 3/2012 | |
| KR | 1250929 | 4/2013 | |
| WO | WO1995004440 | 2/1995 | |
| WO | WO 9949656 | 9/1999 | |
| WO | WO 0010073 | 2/2000 | |
| WO | WO 0038393 | 6/2000 | |
| WO | WO 179956 | 10/2001 | |
| WO | WO 2004/076974 | 9/2004 | |
| WO | WO 2006/028354 | 3/2006 | |
| WO | WO 2006/045819 | 5/2006 | |
| WO | WO 2007/031782 | 3/2007 | |
| WO | WO 2008/008791 | 1/2008 | |
| WO | WO 2008015375 | 2/2008 | |
| WO | WO 2008/035993 | 3/2008 | |
| WO | WO 2008/096134 | 8/2008 | |
| WO | WO2008127316 | 10/2008 | |
| WO | WO 2010/062481 | 6/2010 | |
| WO | WO 2010/109313 | 9/2010 | |
| WO | WO 2012/040703 | 3/2012 | |
| WO | WO2012163675 | 12/2012 | |
| WO | WO 2013/045557 | 4/2013 | |
| WO | WO 2013/054257 | 4/2013 | |
| WO | WO 2013/067539 | 5/2013 | |
| WO | WO 2013/147704 | 10/2013 | |

(56) References Cited

FOREIGN PATENT DOCUMENTS

| WO | WO 2014104531 | 7/2014 |
|---|---|---|
| WO | WO 2014/138123 | 9/2014 |
| WO | WO 2014/172378 | 10/2014 |
| WO | WO 2015065418 | 5/2015 |
| WO | WO2015092533 | 6/2015 |
| WO | WO 2015108882 | 7/2015 |
| WO | WO2015127062 | 8/2015 |

OTHER PUBLICATIONS

Helal, Abdelsalam et al.; "Drishti: An Integrated Navigation System for Visually Impaired and Disabled"; Fifth International Symposium on Wearable Computers 2001 Proceedings; pp. 149-156; 2001.
Parkes, Don; "Audio Tactile Systems for Designing and Learning Complex Environments as a Vision Impaired Person: Static and Dynamic Spatial Information Access"; EdTech-94 Proceedings; 8 pages; 1994.
Zeng, Limin et al.; "Audio-Haptic Browser for a Geographical Information System"; ICCHP 2010, Part II, LNCS 6180; pp. 466-476; 2010.
AlZuhair, Mona Suliman et al.; "NFC Based Applications for Visually Impaired People—A Review"; Multimedia and Expo Workshops (ICMEW), 2014 IEEE International Conference; 6 pages; Jul. 14, 2014.
Graf, Christian; "Verbally Annotated Tactile Maps—Challenges and Approaches"; Spatial Cognition VII, LNAI 6222, pp. 308-318; 2010.
Hamid, Nazatul Naquiah Abd; "Facilitating Route Learning using Interactive Audio-Tactile Maps for Blind and Visually Impaired People"; CHI 2013 Extend Abstracts; pp. 37-42; Apr. 27, 2013.
Ramya, V. et al.; "Voice Assisted Embedded Navigation System for the Visually Impaired"; International Journal of Computer Applications; pp. 42-48; Feb. 2013.
The Nex Band; http://www.mightycast.com/#faq; May 19, 2015; 4 pages.
Cardonha et al.; "A Crowdsourcing Platform for the Construction of Accessibility Maps"; W4A'13 Proceedings of the 10th International Cross-Disciplinary Conference on Web Accessibility; Article No. 26; 2013; 5 pages.
Bujacz et al.; "Remote Guidance for the Blind—A Proposed Teleassistance System and Navigation Trials"; Conference on Human System Interactions; May 25-27, 2008; 6 pages.
Rodriguez et al; "CrowdSight: Rapidly Prototyping Intelligent Visual Processing Apps"; AAAI Human Computation Workshop (HCOMP); 2011; 6 pages.
Chaudary et al.; "Alternative Navigation Assistance Aids for Visually Impaired Blind Persons"; Proceedings of ICEAPVI; Feb. 12-14, 2015; 5 pages.
Garaj et al.; "A System for Remote Sighted Guidance of Visually Impaired Pedestrians"; The British Journal of Visual Impairment; vol. 21, No. 2, 2003; 9 pages.
Coughlan et al.; "Crosswatch: A System for Providing Guidance to Visually Impaired Travelers at Traffic Intersections"; Journal of Assistive Technologies 7.2; 2013; 17 pages.
Sudol et al.; "LookTel—A Comprehensive Platform for Computer-Aided Visual Assistance"; Computer Vision and Pattern Recognition Workshops (CVPRW), 2010 IEEE Computer Society Conference; Jun. 13-18, 2010; 8 pages.
Kammoun et al.; "Towards a Geographic Information System Facilitating Navigation of Visually Impaired Users"; Springer Berlin Heidelberg; 2012; 8 pages.
Bigham et al.; "VizWiz: Nearly Real-Time Answers to Visual Questions" Proceedings of the 23nd annual ACM symposium on User interface software and technology; 2010; 2 pages.
Guy et al; "CrossingGuard: Exploring Information Content in Navigation Aids for Visually Impaired Pedestrians" Proceedings of the SIGCHI Conference on Human Factors in Computing Systems; May 5-10, 2012; 10 pages.
Zhang et al.; "A Multiple Sensor-Based Shoe-Mounted User Interface Designed for Navigation Systems for the Visually Impaired"; 5th Annual ICST Wireless Internet Conference (WICON); Mar. 1-3, 2010; 9 pages.
Shoval et al.; "Navbelt and the Guidecane—Robotics-Based Obstacle Avoidance Systems for the Blind and Visually Impaired"; IEEE Robotics & Automation Magazine, vol. 10, Issue 1; Mar. 2003; 12 pages.
Dowling et al.; "Intelligent Image Processing Constraints for Blind Mobility Facilitated Through Artificial Vision"; 8th Australian and NewZealand Intelligent Information Systems Conference (ANZIIS); Dec. 10-12, 2003; 7 pages.
Heyes, Tony; "The Sonic Pathfinder an Electronic Travel Aid for the Vision Impaired"; http://members.optuszoo.com.au/aheyew40/pa/pf_blerf.html; Dec. 11, 2014; 7 pages.
Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.
Wilson, Jeff, et al. "Swan: System for Wearable Audio Navigation"; 11th IEEE International Symposium on Wearable Computers; Oct. 11-13, 2007; 8 pages.
Borenstein et al.; "The GuideCane—A Computerized Travel Aid for the Active Guidance of Blind Pedestrians"; IEEE International Conference on Robotics and Automation; Apr. 21-27, 1997; 6 pages.
Bhatlawande et al.; "Way-finding Electronic Bracelet for Visually Impaired People"; IEEE Point-of-Care Healthcare Technologies (PHT), Jan. 16-18, 2013; 4 pages.
Blenkhorn et al.; "An Ultrasonic Mobility Device with Minimal Audio Feedback"; Center on Disabilities Technology and Persons with Disabilities Conference; Nov. 22, 1997; 5 pages.
Mann et al.; "Blind Navigation with a Wearable Range Camera and Vibrotactile Helmet"; 19th ACM International Conference on Multimedia; Nov. 28, 2011; 4 pages.
Shoval et al.; "The Navbelt—A Computerized Travel Aid for the Blind"; RESNA Conference, Jun. 12-17, 1993; 6 pages.
Kumar et al.; "An Electronic Travel Aid for Navigation of Visually Impaired Persons"; Communications Systems and Networks (COMSNETS), 2011 Third International Conference; Jan. 2011; 5 pages.
Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun. 2015; 5 pages.
Pagliarini et al.; "Robotic Art for Wearable"; Proceedings of EUROSIAM: European Conference for the Applied Mathematics and Informatics 2010; 10 pages.
Caperna et al.; "A Navigation and Object Location Device for the Blind"; Tech. rep. University of Maryland College Park; May 2009; 129 pages.
Burbey et al.; "Human Information Processing with the Personal Memex"; ISE 5604 Fall 2005; Dec. 6, 2005; 88 pages.
Ghiani, et al.; "Vibrotactile Feedback to Aid Blind Users of Mobile Guides"; Journal of Visual Languages and Computing 20; 2009; 13 pages.
Guerrero et al.; "An Indoor Navigation System for the Visually Impaired"; Sensors vol. 12, Issue 6; Jun. 13, 2012; 23 pages.
Nordin et al.; "Indoor Navigation and Localization for Visually Impaired People Using Weighted Topological Map"; Journal of Computer Science vol. 5, Issue 11; 2009; 7 pages.
Hesch et al.; "Design and Analysis of a Portable Indoor Localization Aid for the Visually Impaired"; International Journal of Robotics Research; vol. 29; Issue 11; Sep. 2010; 15 pgs.
Joseph et al.; "Visual Semantic Parameterization—To Enhance Blind User Perception for Indoor Navigation"; Multimedia and Expo Workshops (ICMEW), 2013 IEEE International Conference; Jul. 15, 2013; 7 pages.
Katz et al; "NAVIG: Augmented Reality Guidance System for the Visually Impaired"; Virtual Reality (2012) vol. 16; 2012; 17 pages.
Rodríguez et al.; "Assisting the Visually Impaired: Obstacle Detection and Warning System by Acoustic Feedback"; Sensors 2012; vol. 12; 21 pages.

(56) References Cited

OTHER PUBLICATIONS

Treuillet; "*Outdoor/Indoor Vision-Based Localization for Blind Pedestrian Navigation Assistance*"; WSPC/Instruction File; May 23, 2010; 16 pages.
Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.
Wang, et al.; "*Camera-Based Signage Detection and Recognition for Blind Persons*"; 13th International Conference (ICCHP) Part 2 Proceedings; Jul. 11-13, 2012; 9 pages.
Krishna et al.; "*A Systematic Requirements Analysis and Development of an Assistive Device to Enhance the Social Interaction of People Who are Blind or Visually Impaired*"; Workshop on Computer Vision Applications for the Visually Impaired; Marseille, France; 2008; 12 pages.
Lee et al.; "*A Walking Guidance System for the Visually Impaired*"; International Journal of Pattern Recognition and Artificial Intelligence; vol. 22; No. 6; 2008; 16 pages.
Ward et al.; "*Visual Experiences in the Blind Induced by an Auditory Sensory Substitution Device*"; Journal of Consciousness and Cognition; Oct. 2009; 30 pages.
Merino-Garcia, et al.; "*A Head-Mounted Device for Recognizing Text in Natural Sciences*"; CBDAR'11 Proceedings of the 4th International Conference on Camera-Based Document Analysis and Recognition; Sep. 22, 2011; 7 pages.
Yi, Chucai; "*Assistive Text Reading from Complex Background for Blind Persons*"; CBDAR' 11 Proceedings of the 4th International Conference on Camera-Based Document Analysis and Recognition; Sep. 22, 2011; 7 pages.
Yang, et al.; "*Towards Automatic Sign Translation*"; The Interactive Systems Lab, Carnegie Mellon University; 2001; 5 pages.
Meijer, Dr. Peter B.L.; "*Mobile OCR, Face and Object Recognition for the Blind*"; The vOICe, www.seeingwithsound.com/ocr.htm; Apr. 18, 2014; 7 pages.
OMRON; Optical Character Recognition Sensor User's Manual; 2012; 450 pages.
Park, Sungwoo; "*Voice Stick*"; www.yankodesign.com/2008/08/21/voice-stick; Aug. 21, 2008; 4 pages.
Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.
Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.
Glover et al.; "*A Robotically-Augmented Walker for Older Adults*"; Carnegie Mellon University, School of Computer Science; Aug. 1, 2003; 13 pages.
OrCam; www.orcam.com; Jul. 22, 2014; 3 pages.
Eccles, Lisa; "*Smart Walker Detects Obstacles*"; Electronic Design; http://electronicdesign.com/electromechanical/smart-walker-detects-obstacles; Aug. 20, 2001; 2 pages.
Graft, Birgit; "*An Adaptive Guidance System for Robotic Walking Aids*"; Journal of Computing and Information Technology—CIT 17; 2009; 12 pages.
Frizera et al.; "*The Smart Walkers as Geriatric Assistive Device. The SIMBIOSIS Purpose*"; Gerontechnology, vol. 7, No. 2; Jan. 30, 2008; 6 pages.
Rodriquez-Losada et al.; "*Guido, The Robotic Smart Walker for the Frail Visually Impaired*"; IEEE International Conference on Robotics and Automation (ICRA); Apr. 18-22, 2005; 15 pages.
Kayama et al.; "*Outdoor Environment Recognition and Semi Autonomous Mobile Vehicle for Supporting Mobility of the Elderly and Disabled People*"; National Institute of Information and Communications Technology, vol. 54, No. 3; Aug. 2007; 11 pages.
Kalra et al.; "*A Braille Writing Tutor to Combat Illiteracy in Developing Communities*"; Carnegie Mellon University Research Showcase, Robotics Institute; 2007; 10 pages.

Blaze Engineering; "*Visually Impaired Resource Guide: Assistive Technology for Students who use Braille*"; Braille 'n Speak Manual; http://www.blaize.com; Nov. 17, 2014; 5 pages.
AppleVis; *An Introduction to Braille Screen Input on iOS 8*; http://www.applevis.com/guides/braille-ios/introduction-braille-screen-input-ios-8, Nov. 16, 2014; 7 pages.
Dias et al.; "*Enhancing an Automated Braille Writing Tutor*"; IEEE/RSJ International Conference on Intelligent Robots and Systems; Oct. 11-15, 2009; 7 pages.
D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.
Trinh et al.; "*Phoneme-based Predictive Text Entry Interface*"; Proceedings of the 16th International ACM SIGACCESS Conference on Computers & Accessibility; Oct. 2014; 2 pgs.
Merri et al.; "*The Instruments for a Blind Teacher of English: The challenge of the board*"; European Journal of Psychology of Education, vol. 20, No. 4 (Dec. 2005), 15 pages.
Kirinic et al.; "*Computers in Education of Children with Intellectual and Related Developmental Disorders*"; International Journal of Emerging Technologies in Learning, vol. 5, 2010, 5 pages.
Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.
Wu et al. "Fusing Multi-Modal Features for Gesture Recognition", Proceedings of the 15th ACM on International Conference on Multimodal Interaction, Dec. 9, 2013, ACM, pp. 453-459.
Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" 10th USENIX Symposium on Networked Systems Design and Implementation (NSDI'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16th International Symposium on Wearable Computers; pp. 166-167; 2012.
Singhal; "The Development of an Intelligent Aid for Blind and Old People;" *Emerging Trends and Applications in Computer Science (ICETACS), 2013 1st International Conference*; pp. 182-185; Sep. 13, 2013.
Aggarwal et al.; "All-in-One Companion for Visually Impaired;" *International Journal of Computer Applications*; vol. 79, No. 14; pp. 37-40; Oct. 2013.
"Light Detector" *EveryWare Technologies*; 2 pages; Jun. 18, 2016.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Shidujaman et al.; "Design and navigation Prospective for Wireless Power Transmission Robot;" IEEE; Jun. 2015.
Zhang, Shanjun; Yoshino, Kazuyoshi; A Braille Recognition System by the Mobile Phone with Embedded Camera; 2007; IEEE.
Diallo, Amadou; Sep. 18, 2014; Apple iOS8: Top New Features, Forbes Magazine.

(56) References Cited

OTHER PUBLICATIONS

N. Kalar, T. Lawers, D. Dewey, T. Stepleton, M.B. Dias; Iterative Design of a Braille Writing Tutor to Combat Illiteracy; Aug. 30, 2007; IEEE.

* cited by examiner

| BREADCRUMB FILE NO. | BREADCRUMB FROM USER OR CLOUD/TITLE | GEOCOORDINATES OF LOCATION | LOCATION ON MAP | HAPTIC DEVICE |
|---|---|---|---|---|
| 1 | USER GOLDEN GATE BRIDGE | 37.8 LAT. -122.4 LONG. | SAN FRANCISCO | PIN 14 |
| 2 | CLOUD HOLLYWOOD | 34 LAT. -118 LONG. | LOS ANGELES | PIN 27 |
| 3 | USER HOME SIDEWALK CRACK | 36 LAT. -115 LONG. | LAS VEGAS | PIN 23 |
| 4 | ... | ... | ... | ... |

FIG. 3

SYSTEM AND METHOD FOR STORING AND PLAYBACK OF INFORMATION FOR BLIND USERS

BACKGROUND

1. Field

The present disclosure relates to the storing and playback of information related to a user's environment, and more particularly to a system and method for storing and playback of information for blind users.

2. Description of the Related Art

Many individuals are using smart phones in place of having to look up information from a variety of different sources. For example, in the past, many individuals would watch television to obtain weather information, review a calendar to obtain appointment information, study a map to obtain directions to a point of interest and use a camera to take pictures. Now, a single smart phone can be used to obtain all this information.

In addition, smart phones can be used to share this information with one or more users. For example, applications or apps such as Facebook®, Instagram® and Waze® allow users to share directions, news, photos, weather and other information with other users. In particular, the Waze® app allows users to obtain driving directions to a point of interest as well as allows users to upload information about his or her driving experience for others to view.

Unfortunately, for blind users, obtaining and sharing this information is not that simple. For example, a blind user may need to navigate an environment but will find it difficult to use a smart phone for this task. Also, existing apps for smart phones are not well-suited for blind users because they do not provide the features and functions needed for blind users. For example, a blind user generally needs to use different devices to obtain this information than a person that can see. That is, blind users may need other sensory devices to obtain this information.

Thus, there is a need for a system and method for better assisting blind users in navigating environments by allowing this information to be stored and played back for blind users.

SUMMARY

A system for providing information to a blind user. The system includes a haptic display including a plurality of sensors positioned thereon, a map positioned on or superimposed onto the haptic display and including points of interest where each point of interest is positioned adjacent to or directly on at least one of the plurality of sensors, and a memory for storing a plurality of breadcrumb files where each of the plurality of breadcrumb files corresponds to at least one of the points of interest and contains information related to at least one of an environment, an object, an obstacle, a path or a location. The system also includes a processor, coupled to the memory, for determining which point of interest has been selected based on contact with at least one of the points of interest and an output device configured to be held or worn by the blind user and configured to provide the information contained in the breadcrumb file corresponding to the selected point of interest to the blind user.

A system for providing information to a blind user. The system includes a haptic device including a plurality of sensors positioned thereon, a map positioned on or superimposed onto the haptic device and including points of interest where each point of interest corresponds to at least one of the plurality of sensors, and a memory for storing a plurality of breadcrumb files where each of the plurality of breadcrumb files corresponds to at least one of the points of interest and contains information related to at least one of an environment, an object, an obstacle, a path or a location. The system also includes a processor, coupled to the memory, for determining which point of interest has been selected based on contact with at least one of the points of interest and a necklace having a speaker and a vibration unit, configured to be worn by the blind user and configured to provide the information contained in the breadcrumb file corresponding to the selected point of interest to the blind user via a combined audio/tactile immersive experience by activating the vibration unit to generate vibrations while simultaneously reproducing audio from the selected breadcrumb file using the speaker.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 3 is a table stored in the memory with information about the breadcrumb file according to an embodiment of the present invention;

DETAILED DESCRIPTION

Figure 1:
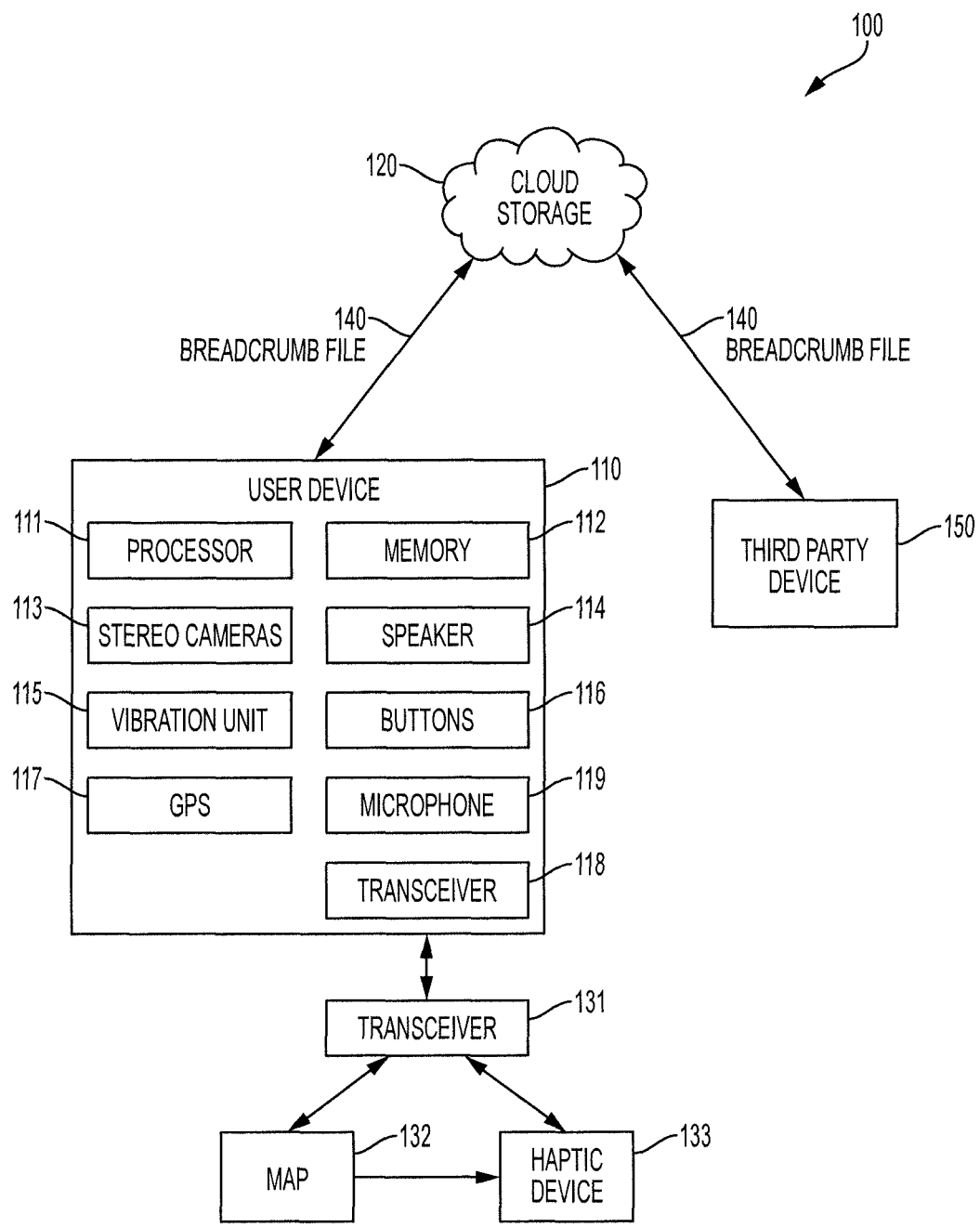
FIG. 1 is a block diagram of a system for providing information to a user according to an embodiment of the present invention.

The invention provides a user device that allows users, such as a blind person or a person unfamiliar with the surroundings or environment, the ability to save information regarding his or her surroundings or environment for later retrieval and use. The user may access this previously stored information to help him or her navigate the environment during subsequent visits. The information may include information regarding an environment, an object, an obstacle, a path or a location. In addition, third parties can capture or save information regarding an environment, an object, an obstacle, a path or a location and share this information with the user of the user device. For example, a third party may upload this information to a cloud storage for retrieval and use by the user of the user device. Obtaining information from third parties is particularly helpful for blind individuals who generally rely on senses other than sight or other individuals to obtain an understanding of their surroundings or environment. On playback of the information, the processor may create a combined audio/tactile immersive experience for the blind user by activating a vibration unit to generate vibrations while simultaneously reproducing the audio information.

An exemplary system for providing information to a blind user is disclosed. The system includes a haptic display including a plurality of sensors positioned thereon, a map positioned on or superimposed onto the haptic display and including points of interest where each point of interest is positioned adjacent to, directly on or directly in contact with at least one of the plurality of sensors, and a memory for storing a plurality of breadcrumb files where each of the plurality of breadcrumb files corresponds to at least one of the points of interest and contains information related to at least one of an environment, an object, an obstacle, a path or a location. In one embodiment, each point of interest on the map may correspond to at least one of the plurality of sensors.

The term "breadcrumb file" will be used herein to refer to an electronic audio and/or video file that stores the information that has been recorded by a user or a third party. The electronic file may be stored in an uncompressed audio format such as WAV, AIFF, AU, raw header-less PCM, etc. or a compressed audio format such as FLAC, MP3, etc. One or more breadcrumb files may be saved for a particular environment, object, obstacle, path or location. Additional information that is captured and stored in the breadcrumb file may include trajectories (e.g., a path from an entrance of the mall to the bathroom) and annotations of the environment tip (e.g., lots of tables here, be careful). The breadcrumb file may include map data, image data, audio data, video data, text data, location data, vibration data and any other data capable of being stored on an electronic device. The breadcrumb file may be stored in the memory 112, the cloud storage 120 and/or the third party device 150.

The system also includes a processor for determining which point of interest has been selected based on contact with at least one of the points of interest and an output device configured to be held or worn by the blind user and configured to provide the information contained in the breadcrumb file corresponding to the selected point of interest to the blind user.

Figure 2:
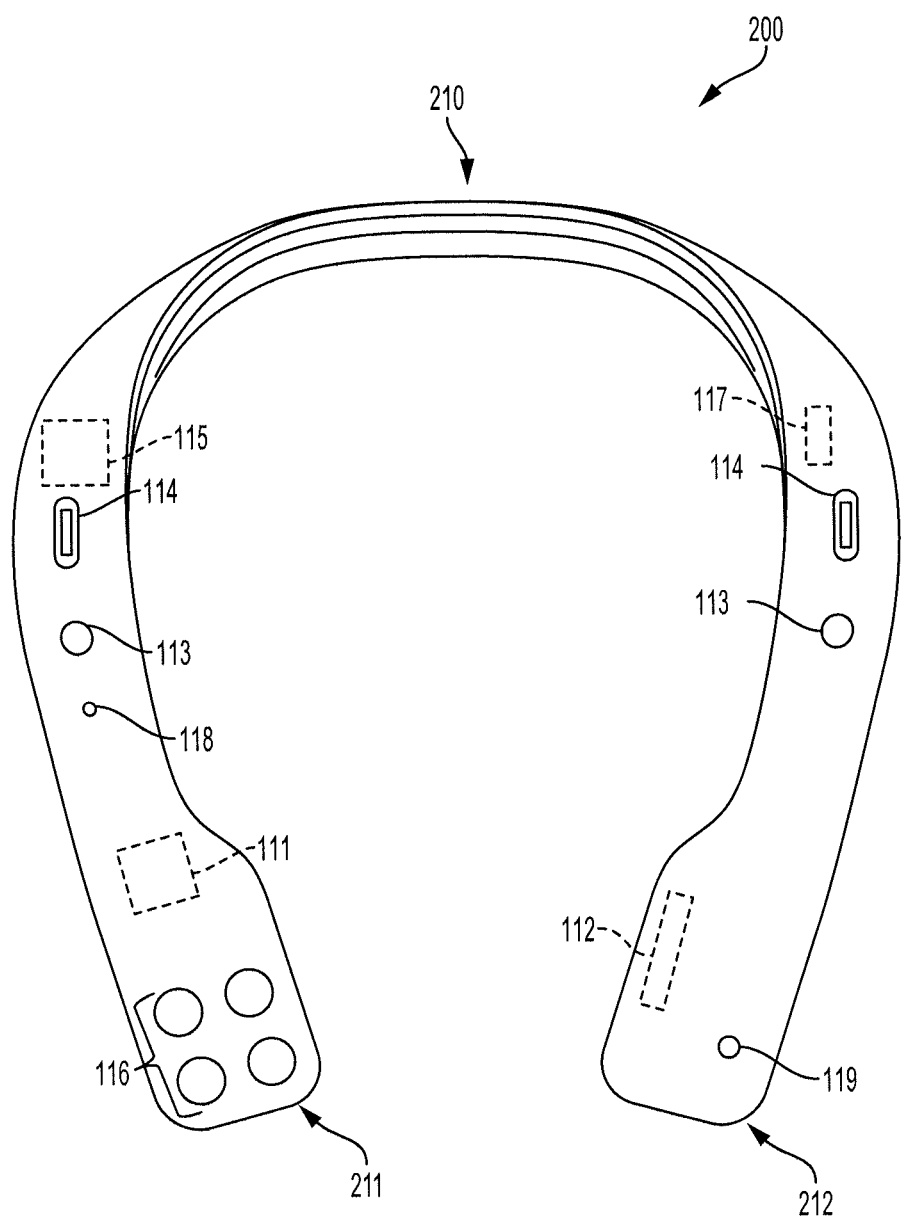
FIG. 2 is an exemplary blind user device shown in the form of a wearable or portable smart device or necklace according to an embodiment of the present invention.

FIG. 1 is a block diagram of a system 100 for providing information to a user according to an embodiment of the present invention. The system 100 may include a user device 110, a cloud storage 120 and a third party device 150. The components of the user device 110 may be part of or integrated into a wearable or portable smart device 200 as shown in FIG. 2. The components and groupings shown in FIG. 1 are representative and other components and groupings are within the scope of the present invention. In addition, certain implementations may have more or less components than illustrated in FIG. 1. The user device 110 may be implemented as a hand-held device, a smart phone, a hat, a necklace, an earpiece, eyeglasses, a smart watch, a smart clip or the like.

The user device 110 may include a processor 111, a memory 112, stereo cameras 113, a speaker 114, a vibration unit 115, buttons 116, a global positioning system (GPS) 117, a transceiver 118 and a microphone 119. The user device 110 may also include a battery (not shown) for powering the components of the user device 110. The processor 111 may be a computer processor such as an ARM processor, DSP processor, distributed processor, microprocessor, controller or other processing device. The memory 112 may be one or any combination of the following: a RAM, a ROM or other volatile or nonvolatile memory, a non-transitory memory or a data storage device, such as a hard disk drive, a solid state disk drive, a hybrid disk drive or other appropriate data storage. The memory 112 may further store machine-readable instructions which may be loaded into the memory 112 and executed by the processor 111. As with the processor 111, the memory 112 may be part of or integrated into the wearable or portable smart device 200 of FIG. 2, may be positioned remote from the wearable or portable smart device 200 or may be a pairing of a local and a remote memory.

The stereo cameras 113 may be a stereo camera pair including two cameras offset by a stereo distance. The stereo cameras 113 may be used to take video or capture images of the surrounding environment. The speaker 114 may be one or more output devices or other devices capable of producing sounds or sound waves. The vibration unit 115 may be one or more vibration motors or actuators capable of providing haptic and tactile output. In some implementations, the vibration unit 115 may also be capable of producing sounds, such that the speaker 114 and the vibration unit 115 may be the same or integrated. In some implementations, the speaker 114 and the vibration unit 115 can be activated simultaneously to create a combined audio/tactile immersive experience.

The buttons 116 may be used to turn on and turn off the various components of the user device 110. For example, a first button may be used to turn on and off the stereo cameras 113, a second button may be used to turn on and off the speaker 114, a third button may be used to turn on and off the vibration unit 115 and a fourth button may be used to turn on and off the microphone 119. The buttons 116 may also be configured to operate as inputs to the wearable or portable smart device 200 such that a mode or operation of the wearable or portable smart device 200 can be changed by selecting one or more of the buttons 116. The GPS 117 may be one or more GPS units that can be used to determine the location of the user device 110.

The transceiver 118 can be a receiver and/or transmitter configured to receive and transmit data (e.g., breadcrumb files 140) from the cloud storage 120, the third party device 150 and/or the transceiver 133. The transceiver 118 may include an antenna (not shown) capable of transmitting and receiving wireless communications. For example, the antenna may be a Bluetooth or WiFi antenna, may be a radio frequency identification (RFID) antenna or reader and/or a near field communication (NFC) unit.

The microphone 119 may be a microphone or other device capable of detecting and receiving sounds, such as voice activation/commands or other voice actions from the user, from the surrounding environment and may be part of or integrated into the wearable or portable smart device 200 or external to the wearable or portable smart device 200.

FIG. 2 is an exemplary user device 110 shown in the form of a wearable or portable smart device or necklace 200 according to an embodiment of the present invention. The smart necklace 200 may be designed to be worn around a user's neck such that a top portion 210 of the smart necklace 200 rests on the back of the user's neck and a first end 211 and a second end 212 may rest on a user's shoulders or chest. The necklace 200 is advantageously formed in the shape of a "U" and lays flat on the user's chest when around the user's neck to better allow the stereo cameras 113 to view the surroundings in front of the user. The components in FIG. 1 are shown in or on the smart necklace 200. The components are shown in exemplary locations and can be positioned in different location in or on the smart necklace 200.

Referring back to FIG. 1, the user device 110 allows users, such as a blind person or a person unfamiliar with the surroundings or environment, the ability to save information in breadcrumb files 140, in the memory 112, regarding his or her surroundings or environment for later retrieval and use. The information may include information regarding an environment, an object, an obstacle, a path or a location. As an example, the user may be walking or navigating a space and she may find something interesting, such as an obstacle. The user may push one of the buttons 116 to store the information regarding the obstacle. For example, the user may push a button and speak to create or record a breadcrumb, for example, audio (e.g., a verbal description) about the object or location of the obstacle or text to label the object, or push a button to tag a location of the object, etc. This information will be useful to the blind user the next time the blind user encounters this environment.

As another example, the user may be visiting the Golden Gate Bridge and may want to save that the Golden Gate Bridge is 1.7 miles in length for later retrieval and use. In addition, third parties can capture or save information regarding an environment, an object, an obstacle, a path or a location and share this information with the user of the user device 110. For example, a third party may upload this information to the cloud storage 120 for retrieval and use by the user of the user device 110. Obtaining information from third parties is particularly helpful for blind individuals who generally rely on senses other than sight or other individuals to obtain an understanding of their surroundings or environment.

The user of the user device 110 may encounter something of interest and may want to save this information for later retrieval and use. Using the user device 110, the user may activate the stereo cameras 113 and/or the microphone 119 to capture information or data related to something of interest such as an environment, an object, an obstacle, a path, a point of interest or a location (step 605). For example, the user may push the button 116 to begin an audio recording. Thereafter, the user can speak into the microphone 119 and state that the Golden Gate Bridge is made of steel. After the audio recording is completed, the user can stop the audio recording by pushing the button 116. The information (e.g., the audio recording) can be saved in the memory 112.

Also, the user may push the button 116 to begin a video recording. Thereafter, the stereo cameras 113 will record information (e.g., a crack in the sidewalk) in the direction of the stereo cameras 113 (e.g., in front of the user) for later retrieval and use. For example, the user may record or tag the crack in the sidewalk that she encounters so that she may be warned of it the next time she comes across it. After the video recording is completed, the user can stop the video recording by pushing the button 116. The information (e.g., the video recording) can be saved in the memory 112 with its corresponding geo coordinates. The information from the user is stored in the memory 112 as a breadcrumb file 140 (step 615).

The information may also be provided to the cloud storage 120 by crowdsourcing or a third party using the third party device 150. For example, the third party can upload information about their retail store such as the store name, store location, hours of operation and current sales. The information from the third party can be uploaded and stored in the cloud storage 120 as a breadcrumb file 140. The breadcrumb file 140 from the cloud storage 120 can be shared by users and can be periodically downloaded to the memory 112 or can be downloaded or accessed upon request by the user or physical location of the user (step 610). For example, as the user physically approaches the Golden Gate Bridge or touches San Francisco on the map 132, the processor 111 may instruct the speaker 114 and/or the vibration unit 115 to reproduce the information contained on the breadcrumb file 140 and corresponding to the Golden Gate Bridge and/or San Francisco. The processor 111 can also automatically deliver and play the breadcrumb file 140 to the user when the GPS 117 determines that the user is physically in an environment that has a corresponding breadcrumb file 140.

FIG. 3 is a table 300 stored in the memory 112 with information about the breadcrumb file 140 according to an embodiment of the present invention. The processor 111 creates and stores the table 300 in the memory 112. For example, the table 300 includes information such as whether the breadcrumb file 140 was created by the user or received via the cloud storage 120 from a third party device 150. The table 300 also includes the title of the breadcrumb file 140. The title can be created or recorded by the user or the third party user (step 620). This advantageously allows the user to listen to the title without having to play the entire recording.

The GPS unit 117 may determine or receive the geo coordinates of the location of the recording of the breadcrumb file 140 (step 625). For example, if the user records the information in San Francisco, the geo coordinates can be of San Francisco. Alternatively, the geo coordinates can be of the location of the information contained on the recording. For example, if the user records the information in Los Angeles but the information is about San Francisco, the geo coordinates can be of San Francisco. Based on the title and/or the geo coordinates, the processor 111 can determine the closest landmark or city and populate the location on the map field.

For indoor mapping, the GPS unit 117 may not be able to determine or receive the geo coordinates of the location of the recording of the breadcrumb file 140. In this situation, other localization and mapping algorithms are used by the processor 111 to determine or receive the geo coordinates or other information representing the location of the recording of the breadcrumb file 140. For example, a WiFi indoor triangulation system (ITS), an algorithm such as simultaneous localization and mapping (SLAM) used with the stereo cameras 113 or lasers, or other devices and algorithms can be used to determine geo coordinates or other information to accurately identify the location of walls, rooms, objects, obstacles, or other indoor items.

Figure 4A:
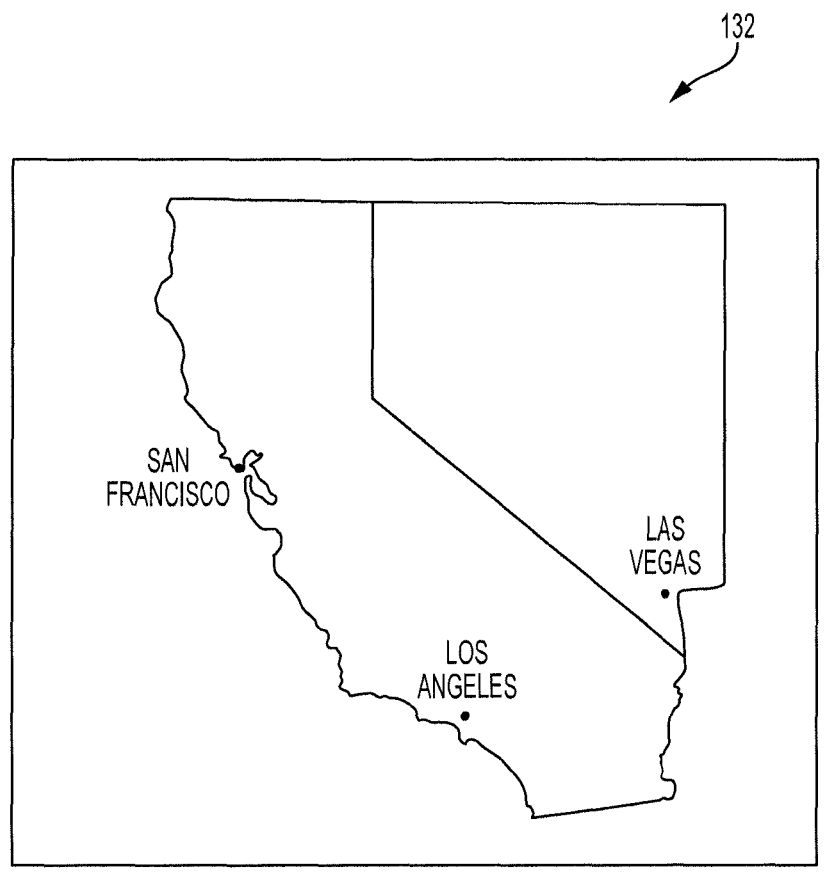
FIG. 4A is an exemplary map showing various cities in California and Nevada according to an embodiment of the present invention.

FIG. 4A is an exemplary map 132 showing various cities in California and Nevada according to an embodiment of the present invention. The map 132 may also show various views and details. For example, the map 132 can be more detailed and show roads, sidewalks and landmarks in San Francisco. The map 132 can also show points of interest, environments, objects, obstacles, paths, locations, cities, states and other items of interest.

Figure 4B:
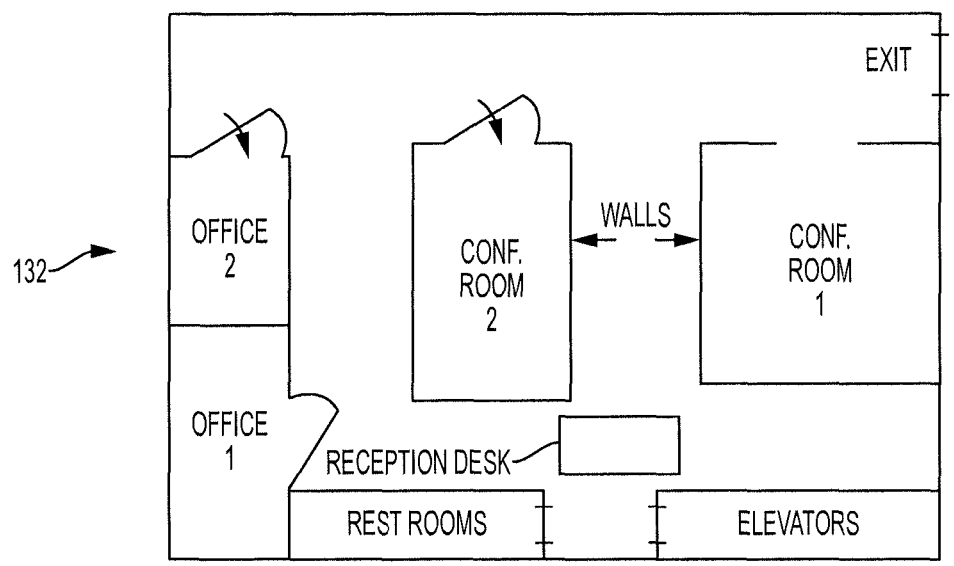
FIG. 4B is an exemplary map showing indoor office space with offices, conference rooms, a reception desk, walls, elevators, restrooms and an exit according to an embodiment of the present invention.

FIG. 4B is an exemplary map 132 showing indoor office space with offices, conference rooms, a reception desk, walls, elevators, restrooms and an exit according to an embodiment of the present invention. The map 132 can include a map of any indoor location such as airports, malls, homes, apartments, office buildings, restaurants, theaters, etc. The map 132 of FIG. 4B shows obstacles such as walls, objects such as the reception desk and locations or points of interest such as offices, conference rooms, restrooms, elevators and the exit.

In one embodiment, the map 132 includes Braille markings describing what is shown on the map 132. For example, the map 132 may include the Braille representation of San Francisco on the map 132 so that when the user runs his or her fingers over the map 132, the user will know what he or she is touching. The map 132 can also have sensors thereon to indicate what the user is touching (step 630). If no corresponding breadcrumb file exists, then the sensors can be non-existent to the blind user's touch indicating to the blind user that no breadcrumb files exists for that particular point of interest.

In one embodiment, the stereo cameras 113 can determine what the user is touching using optical character recognition or recognition or reading of the Braille characters (step 630). The processor 111 can then determine whether a breadcrumb file corresponding to what the user is touching exists and then automatically playing back the breadcrumb file 140 corresponding to what the user is touching (step 635). Alternatively, the processor 111 will notify the user via audio or vibration that a breadcrumb file 140 exists. The user can then push the button 116 to play the breadcrumb file 140 associated with what the user is touching. Hence, in certain embodiments, the haptic device 133 may be optional.

Figure 5:
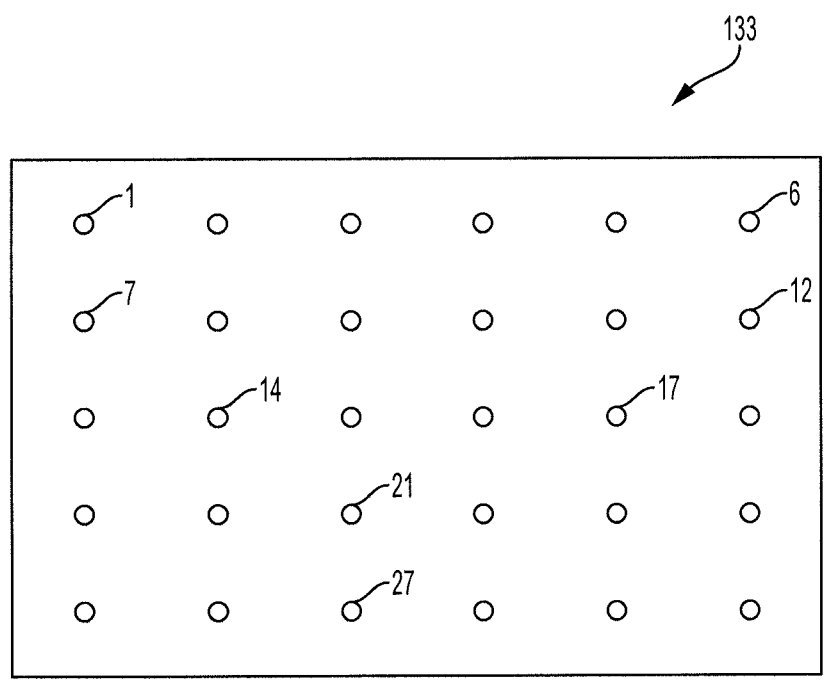
FIG. 5 is an exemplary haptic device showing 30 pin contacts or sensors according to an embodiment of the present invention.
Figure 6:
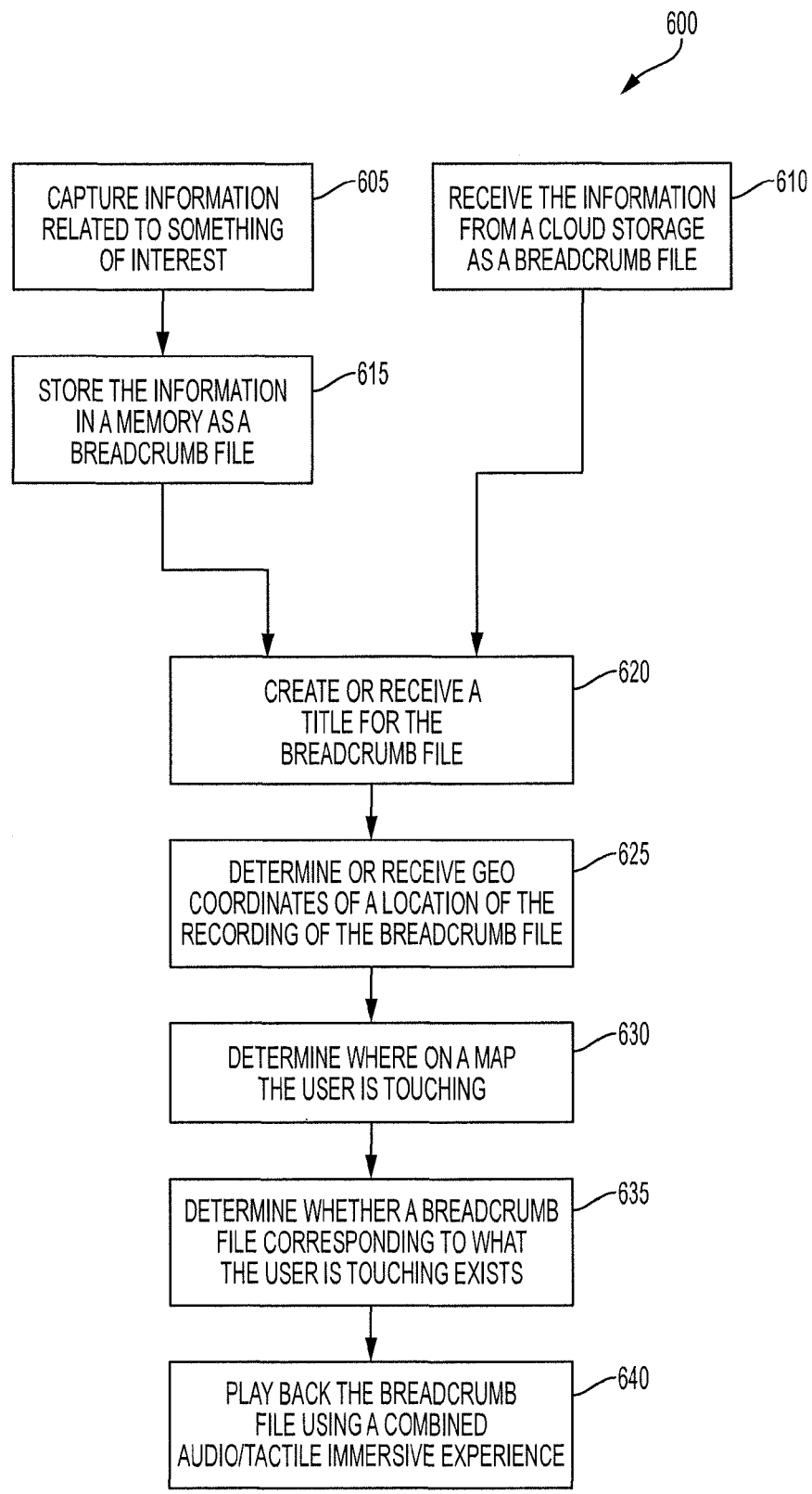
FIG. 6 is a method for providing information to a user according to an embodiment of the present invention.

FIG. 5 is an exemplary haptic device 133 showing 30 pin contacts or sensors according to an embodiment of the present invention. In one embodiment, the map 132 can be positioned over or on top of the haptic device 133. As an example, the haptic device 133 can be a haptic pin display having a number of pin contacts or force sensors that determine what the user is touching (step 630). In one embodiment, the haptic device 133 can be a haptic vibrating display, which vibrates when the user touches an area that has a corresponding breadcrumb file 140.

As an example, if the map 132 of FIG. 4A were placed on top of the haptic device 133, San Francisco would correspond to pin 14, Los Angeles would correspond to pin 27 and Las Vegas would correspond to pin 23. As another example, if the map 132 of FIG. 4B were placed on top of the haptic device 133, office 1 would correspond to pin 19, office 2 would correspond to pin 7, the restrooms would correspond to pin 27, the elevators would correspond to pin 29, and the reception desk would correspond to pin 22. Each point of interest on the map 132 may correspond to more than one contact or sensor. For example, office 1 may correspond to pins 19 and 25. The point of interest may also correspond to an entrance to the point of interest. For example, the restrooms may correspond to pin 27 as opposed to pins 26 and 27 since pin 27 is closest to the entrance of the restroom. This will aid the blind user in determining the entrance to the restrooms more easily.

The memory 112 stores a table with data indicating the relationship between the map 132 and the haptic device 133. Hence, if the user were touching San Francisco and/or pin 14, the processor 111 can determine whether a breadcrumb file 140 exists that has information about San Francisco or the geo coordinates corresponding to San Francisco. The information as to what the user is touching is transmitted from the map 132 and/or the haptic device 133 to the user device 110 via transceivers 131 and 118.

The processor 111 may transfer information about the breadcrumb files 140 to the map 132 and/or the haptic device 133. For example, the information may indicate which locations on map 132 or which pins on the haptic device 133 have corresponding breadcrumb files. In one embodiment, only those pins that have corresponding information will be active or cause a bump on the map 132 that can be felt by a user's finger. For example, if no breadcrumb file exists for San Francisco, then pin 14 will be inactive or no bump will appear on the map 132 (e.g., pin is not protruding). Similarly, if a breadcrumb file exists for San Francisco, then pin 14 is active or a bump will appear on the map 132. This advantageously allows the blind user to immediately determine which items or locations on the map 132 have additional information. The pins can also have different shapes to allow a blind user to differential between the different items or locations on the map 132.

On playback of the breadcrumb file 140, the processor 111 may also create an audio, tactile or combined audio/tactile immersive experience for the blind user by activating the vibration unit 115 to generate vibrations while simultaneously reproducing the audio from the breadcrumb file 140 (step 640).

The terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing information to a blind user, comprising:
    a haptic display including a plurality of display sensors positioned thereon;
    a map positioned on or superimposed onto the haptic display and including a plurality of points of interest, each point of interest of the plurality of points of interest being positioned adjacent to or directly on at least one of the plurality of display sensors;
    a memory configured to store a plurality of media files, each media file of the plurality of media files corresponding to at least one of the plurality of points of interest and including information related to at least one of an environment, an object, an obstacle, a path or a location of the at least one of the plurality of points of interest;
    a media sensor configured to detect new media that is at least one of operator-generated media or media captured from the environment and that corresponds to one of the plurality of points of interest or a new point of interest;
    an input device configured to receive a media capture request corresponding to a request for the new media to be captured or stored;
    a processor coupled to the haptic display, the memory, the media sensor, and the input device and configured to:
        update the plurality of media files to include a new media file that includes the new media when the input device receives the media capture request;
        control the haptic display to output data indicating which one or more sensor of the plurality of display sensors is associated with at least one stored media file of the plurality of media files, each of the one or more sensor corresponding to a respective point of interest of the plurality of points of interest, and determine that the respective point of interest has been selected based on contact of the one or more sensor; and an output device configured to be held or worn by the blind user and configured to output the information included in the stored media file associated with the one or more sensor that corresponds to the respective point of interest.

2. The system of claim 1 wherein the output device is configured to output the information included in the stored media file to the blind user via a combined audio and tactile immersive experience by activating a vibration unit within the output device to generate vibrations while simultaneously reproducing audio from the stored media file.

3. The system of claim 1 wherein each sensor of the plurality of display sensors has an active state and a deactive state and is activated when there is a corresponding media file associated with a particular point of interest and deactivated when there is no corresponding media file associated with the particular point of interest.

4. The system of claim 1 wherein each sensor of the plurality of display sensors is tactile only when there is a corresponding media file associated with a particular point of interest that the user is touching.

5. The system of claim 1 wherein the media sensor is further configured to create or obtain the information related to the at least one of the environment, the object, the obstacle or the location and wherein the information corresponding to at least some of the plurality of media files is provided by the media sensor or by a second media sensor of another user device.

6. The system of claim 5 wherein the media sensor includes at least one of a camera, a computer, a necklace device, a smart phone, a video recorder or a voice recorder capable of creating or obtaining the information.

7. The system of claim 1 further comprising a receiver, coupled to the memory, and configured to receive at least some of the plurality of media files from a cloud storage device.

8. The system of claim 1 wherein the haptic display is a haptic pin display or a haptic vibrating display.

9. The system of claim 1 wherein the haptic display is a haptic pin display including a surface and a plurality of pins each corresponding to one of the plurality of display sensors such that the processor is configured to control the haptic display to output data indicating which one or more sensor is associated with the at least one stored media file by controlling a corresponding pin of each of the one or more sensor that is associated with the at least one stored media file to raise above the surface of the haptic pin display.

10. The system of claim 1 wherein the plurality of display sensors are force sensors that are activated by physical contact by the blind user.

11. A system for providing information to a blind user, comprising:
a haptic device including a plurality of display sensors positioned thereon, a surface, and a plurality of pins each corresponding to one of the plurality of display sensors and capable of being raised above the surface;
a map positioned on or superimposed onto the haptic device and including a plurality of points of interest, each point of interest of the plurality of points of interest corresponding to at least one of the plurality of display sensors;
a memory configured to store a plurality of media files, each media file of the plurality of media files corresponding to at least one of the plurality of points of interest and including information related to at least one of an environment, an object, an obstacle, a path or a location of the at least one of the plurality of points of interest;
a media sensor configured to detect new media that is at least one of operator-generated media or media captured from the environment and that corresponds to one of the plurality of points of interest or a new point of interest;
an input device configured to receive a media capture request corresponding to a request for the new media to be captured or stored;
a processor coupled to the haptic device, the memory, the media sensor, and the input device and configured to:
update the plurality of media files to include a new media file that includes the new media when the input device receives the media capture request,
control the haptic display to raise a pin corresponding to each of the plurality of display sensors that is associated with a stored media file of the plurality of media files, each of the plurality of display sensors that is associated with a stored media file corresponding to a respective point of interest of the plurality of points of interest, and
determine that the respective point of interest has been selected based on contact of a respective sensor; and
a necklace having a speaker and a vibration unit, configured to be worn by the blind user and configured to provide the information included in the stored media file associated with the respective sensor that corresponds to the respective point of interest to the blind user via a combined audio and tactile immersive experience by activating the vibration unit to generate vibrations while simultaneously reproducing audio from the stored media file using the speaker.

12. The system of claim 11 wherein each sensor of the plurality of display sensors has an active state and a deactive state and is activated when there is a corresponding media file associated with a particular point of interest and deactivated when there is no corresponding media file associated with the particular point of interest.

13. The system of claim 11 wherein each sensor of the plurality of display sensors is tactile only when there is a corresponding media file associated with a particular point of interest that the blind user is touching.

14. The system of claim 11 wherein the input device is further configured to create or obtain the information related to the at least one of the environment, the object, the obstacle or the location, and wherein the information corresponding to at least some of the plurality of media files is provided by the media sensor or by a second media sensor of another user device.

15. The system of claim 14 wherein the media sensor includes at least one of a camera, a computer, a necklace device, a smart phone, a video recorder or a voice recorder capable of creating or obtaining the information.

16. The system of claim 11 further comprising a receiver, coupled to the memory, and configured to receive at least some of the plurality of media files from a cloud storage device.

17. The system of claim 11 wherein the haptic device further includes a haptic vibrating feature.

18. The system of claim 11 wherein the plurality of display sensors are force sensors that are activated by physical contact by the blind user.

19. The system of claim 11 wherein each media file of the plurality of media files includes a title to allow the blind user the ability to listen to the title without having to play the entire media file.

20. The system of claim 11 wherein the memory is further configured to store a table with data indicating the relationship between each point of interest of the plurality of points of interest on the map and at least one of the plurality of display sensors on the haptic device.

\* \* \* \* \*